United States Patent

[11] 3,628,138

[72] Inventors Garret Braden Collier
 River Vale;
 George Edward Harrington, Chatham, both of N.J.
[21] Appl. No. 7,914
[22] Filed Feb. 2, 1970
[45] Patented Dec. 14, 1971
[73] Assignee Bell Telephone Laboratories, Incorporated
 Murray Hill, N.J.

[54] METHOD FOR IDENTIFYING CONDUCTORS IN A CABLE BY UTILIZING AN AMPLITUDE-MODULATED GAUSSIAN NOISE IDENTIFICATION SIGNAL
 1 Claim, 1 Drawing Fig.
[52] U.S. Cl. .................................................. 324/66, 179/175.3
[51] Int. Cl. .................................................. G01r 31/02, G01r 19/16
[50] Field of Search .......................................... 324/51, 52, 66, 67; 179/175.3

[56] References Cited
UNITED STATES PATENTS

| | | | |
|---|---|---|---|
| 2,869,077 | 1/1959 | Houk ............................ | 324/66 |
| 3,102,231 | 8/1963 | Wolf ............................. | 324/51 X |
| 2,133,384 | 10/1938 | Fisher et al. ................. | 324/66 |
| 2,806,995 | 9/1957 | Meanley ...................... | 324/66 |
| 3,427,538 | 2/1969 | Bohnenblust ................ | 324/66 |
| 3,181,062 | 4/1965 | Scarlett ....................... | 324/66 |

Primary Examiner—Gerard R. Strecker
Attorneys—R. J. Guenther and Edwin B. Cave

ABSTRACT: A method of identifying conductors in a multiconductor cable without interference with service thereon utilizes Gaussian noise. The Gaussian noise is amplitude modulated by an audible tone to generate an inaudible test signal which is placed on a conductor at some location, such as a central office, where the identity of the conductor is known. At some other location where the identity of the conductor within the multiconductor cable is desired, for example at a splice point, the signal can be detected by an appropriate detection apparatus to thereby identify the specific conductor.

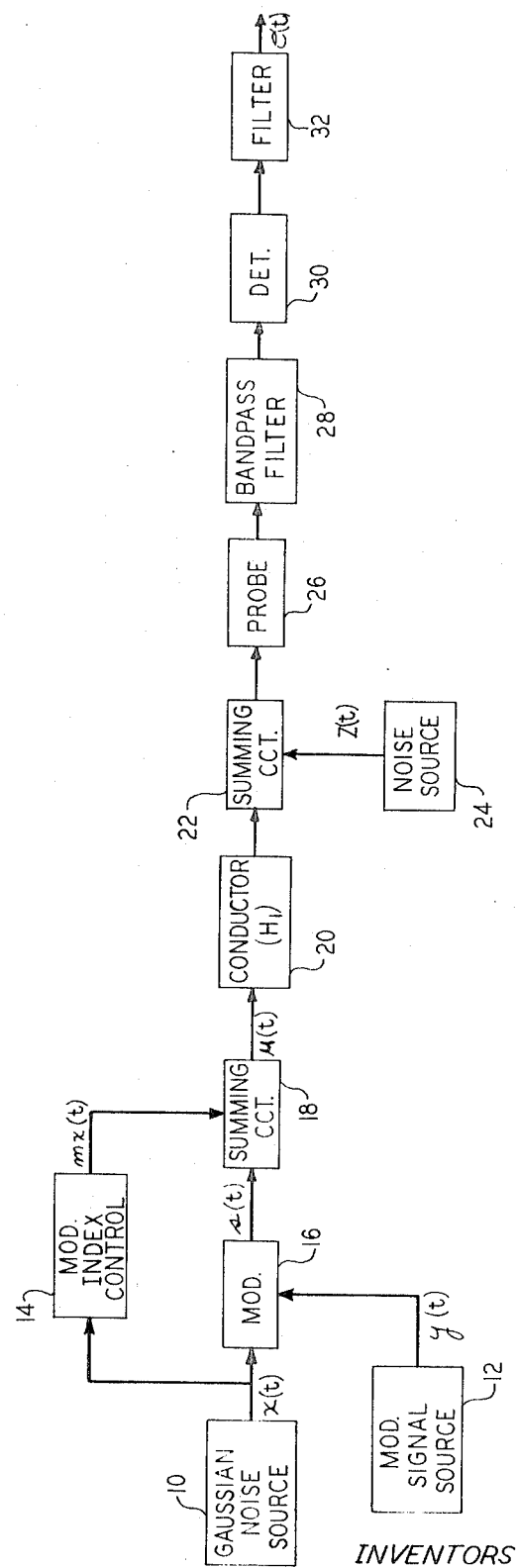
INVENTORS G. B. COLLIER
G. E. HARRINGTON
ATTORNEY

METHOD FOR IDENTIFYING CONDUCTORS IN A CABLE BY UTILIZING AN AMPLITUDE-MODULATED GAUSSIAN NOISE IDENTIFICATION SIGNAL

BACKGROUND OF THE INVENTION

1. Field of the Invention

This invention relates to communication equipment and, more particularly, to a method of identifying any one or all of the individual conductors or wire pairs in a multiconductor cable.

2. Description of the Prior Art

The individual conductors or wire pairs in multiconductor cables are normally twisted or wound together in a random fashion to prevent crosstalk between the conductors. Thus methods of identifying particular conductors within the cable are required when the cable is to be connected to other cables or to terminal equipment. The use of color coding is not satisfactory in many cases and other methods of identifying the individual conductors are required.

Various methods of identifying the individual conductors through the use of electrical signals have been developed. One such method involves the use of resistors and DC signals. The various conductors are connected on one end to different resistances, such as the different terminals of a resistive network, and may be subsequently identified at another point in the cable by detecting the differences in resistance readings of the various conductors. This method is illustrated in O. M. Meldal's U.S. Pat. No. 2,666,898, and F. M. Murphy's U.S. Pat. No. 2,822,519.

Another method of identifying conductors utilizes a test of circuit continuity to trigger identification apparatus. This method is illustrated in G. M. Rosenblum's U.S. Pat. Nos. 2,524,141 and 2,529,227. This method is somewhat analogous to the method previously mentioned which utilizes resistances and DC signals.

Still another method of identifying individual conductors in a multiconductor cable involves placing a test tone on the conductor at a first point in the cable and detecting the tone at subsequent points in the cable to thereby identify the conductor. This method is illustrated in W. J. Meanley's U.S. Pat. No. 2,806,995, E. V. Houk's U.S. Pat. No. 2,869,077 and C. E. Bohenblust's U.S. Pat. No. 3,427,538.

Most of these presently used methods of identifying conductors have a major disadvantage of causing interference with or interruption of service being carried by the conductor during the identification process. In the identification method utilizing a test tone, the use of the tones outside the voice band has been suggested to eliminate this interference with service. However, even this precaution usually does not produce satisfactory results because such tones, although inaudible to normal voice band telephone service, may still produce interference in various wider band services or themselves experience interference from power harmonics. Thus the need exists for a method of identifying individual conductors with a multiconductor cable without interference with service thereon.

Accordingly, it is an object of this invention to identify the individual conductors of a multiconductor cable without interference with service thereon.

Another object is to identify the individual conductors of a multiconductor cable with a minimum of complex apparatus.

Summary of the Invention

The foregoing objects and others are achieved in accordance with the principles of the invention by the utilization of a test signal generated from Gaussian noise. Gaussian noise is amplitude modulated by a suitable audible tone and the resulting inaudible test signal is placed on the conductor at a location where the identity of the conductor is known. At other locations, such as splice points, that conductor may be identified by detecting the presence of the identification signal. Since the signal energy is distributed throughout the entire voice band, the power level at any point within the band is quite low. Thus the identification process may be carried out while a conductor is in use without interference with such use. Relatively simple circuits may be utilized for the noise source, modulator, and detector required.

The invention will be more fully comprehended from the following detailed description and accompanying drawing in which the single FIGURE is a block diagram illustrating the method of the invention.

DETAILED DESCRIPTION

The single FIGURE of the drawing illustrates, in block diagram form, the conductor identification method of this invention. A carrier signal $x(t)$ to be used is band-pass Gaussian noise, i.e., white Gaussian noise passed through an ideal band-pass filter, from noise source 10. A zener diode noise source might advantageously be used for noise source 10. The carrier signal $x(t)$ is combined with a modulating or envelope signal $y(t)$ from modulating signal source 12 by a modulator 16. The envelope signal $y(t)$ might advantageously be a 500 Hz. square wave signal which is generated by an astable multivibrator circuit. Further, the 500 Hz. square wave from the multivibrator circuit might advantageously be frequency modulated by a very low frequency signal such as a 7 Hz. signal to produce a more distinctive envelope signal which could be more easily detected to identify the conductor. This frequency modulated envelope signal would remain inaudible on the conductor.

The modulator 16 might advantageously be a product modulator circuit which produces a double sideband suppressed carrier signal $s(t)$ from the signals $x(t)$ and $y(t)$. A controllable fraction of the carrier signal $mx(t)$ is added to the double sideband suppressed carrier signal $s(t)$ in a summing circuit 18 to produce a final identification signal $u(t)$. The fraction of the carrier signal $mx(t)$ which is utilized is controlled by a modulation index control circuit 14. The energy of the identification signal $u(t)$ is spread across the entire voice band. Thus the energy level at any particular frequency is quite low and the test signal does not interfere with communications on the conductor.

The identification signal $u(t)$ is placed on one end of a conductor 20 for which an identification is desired. With respect to the identification signal $u(t)$, the complete transmission channel is characterized by the conductor 20 having a system function $H_1$ to which is added a noise signal $z(t)$ from source 24 in summing circuit 22. Noise source 24 represents any disturbance such as line noise or the subscriber's signal.

At a point such as the splice point where the identity of the conductor is to be determined, the multiconductor cable is probed by a suitable probe 26 so that the conductor carrying the identification signal may be ascertained. A capacitance probe might advantageously be used for probe 26 in order to eliminate the need for metallic contact with the conductors. Suitable probes are presently known in the art. The output from probe 26 is presented to a broadband band-pass filter 28 to eliminate out-of-band noise. The signal from filter 28 is then passed to a detector 30 which recovers the envelope signal from the transmitted identification signal. A square-law detector might advantageously be utilized for detector 30. The detector output is further processed by a filter 32 to select the final output signal $e(t)$ which is audible to the craftsman seeking to identify the conductor. The output signal $e(t)$ should correspond to the envelope or modulating signal $y(t)$. Thus the identity of the conductor transmitting the identification signal may be readily established. The identification procedure is repeated for each conductor within the multiconductor cable for which an identification is desired.

Various modifications to the illustrated method of identifying conductors could be made without departing from the spirit and scope of the invention. For example, the waveform and frequency of the envelope signal could be changed. The method of this invention might be used in combination with other identification methods to give a system where the signal is automatically stepped from conductor to conductor to increase the efficiency of the identification process.

We claim:
1. The method of identifying a discrete conductor in a multiconductor cable comprising the steps of:
  identifying said conductor at a first point in said cable;
  placing on said conductor an inaudible identification signal comprising voice-band Gaussian noise amplitude modulated by an audible envelope signal, said Gaussian noise having a power level at any point within the voice band substantially lower than the power level at said point of information signals transmitted on said conductor so that said identification signal can be transmitted simultaneously with said information signal without degrading said information signals; and
  probing the conductors in said cable at a second point with a detector to detect said audible envelope signal so that said conductor carrying said identification signal can be identified.